May 23, 1933.　　A. J. WEATHERHEAD, JR　　1,909,989
HYDRAULIC BRAKE SYSTEM FOR AUTOMOBILES
Filed May 26, 1930　　2 Sheets-Sheet 1
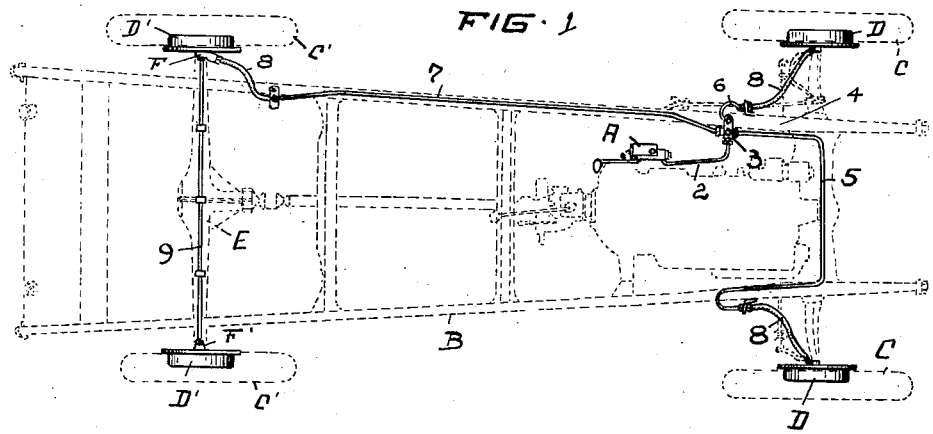
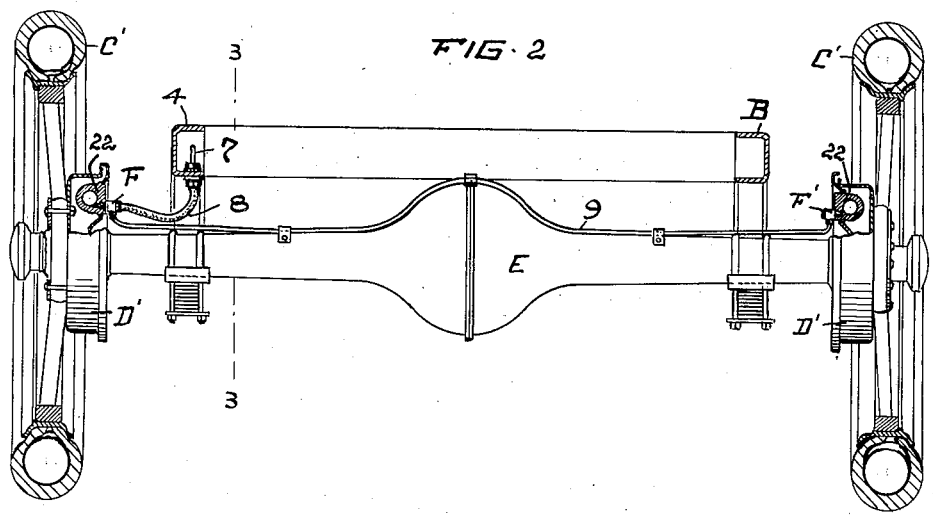
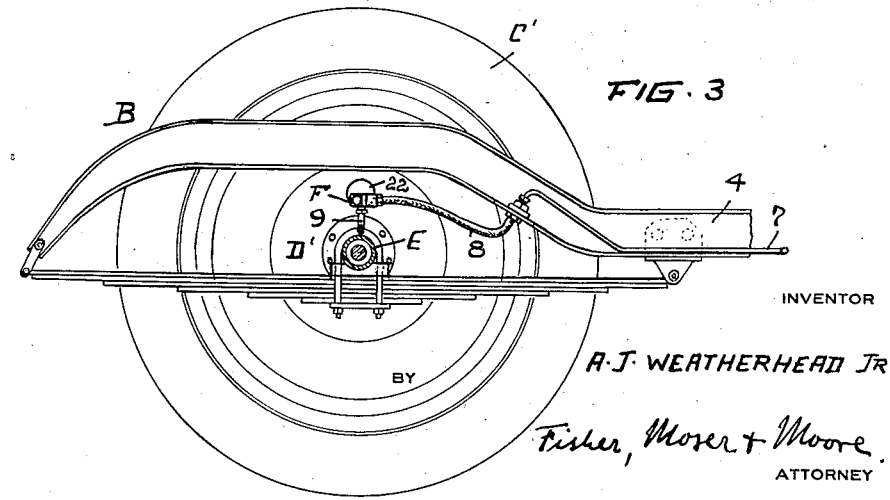
INVENTOR
A. J. WEATHERHEAD JR.
BY Fisher, Moser & Moore
ATTORNEY May 23, 1933. A. J. WEATHERHEAD, JR 1,909,989
HYDRAULIC BRAKE SYSTEM FOR AUTOMOBILES
Filed May 26, 1930 2 Sheets-Sheet 2
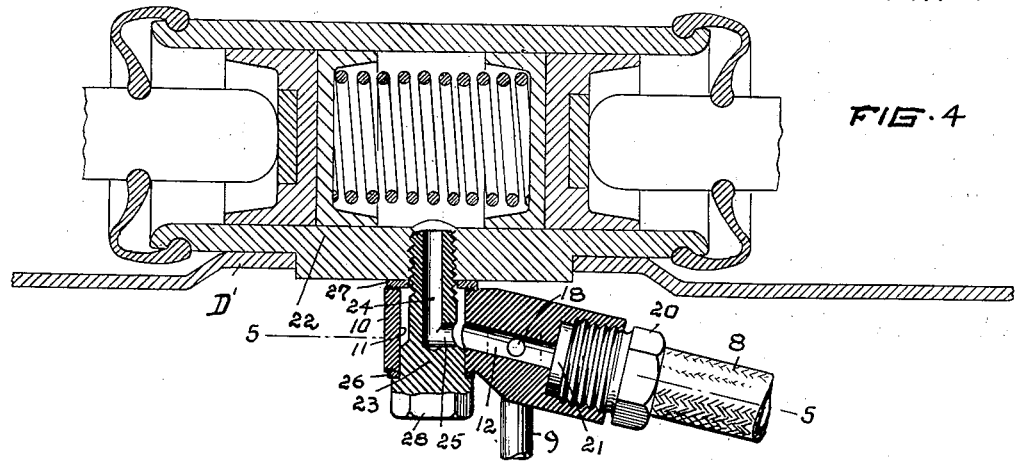
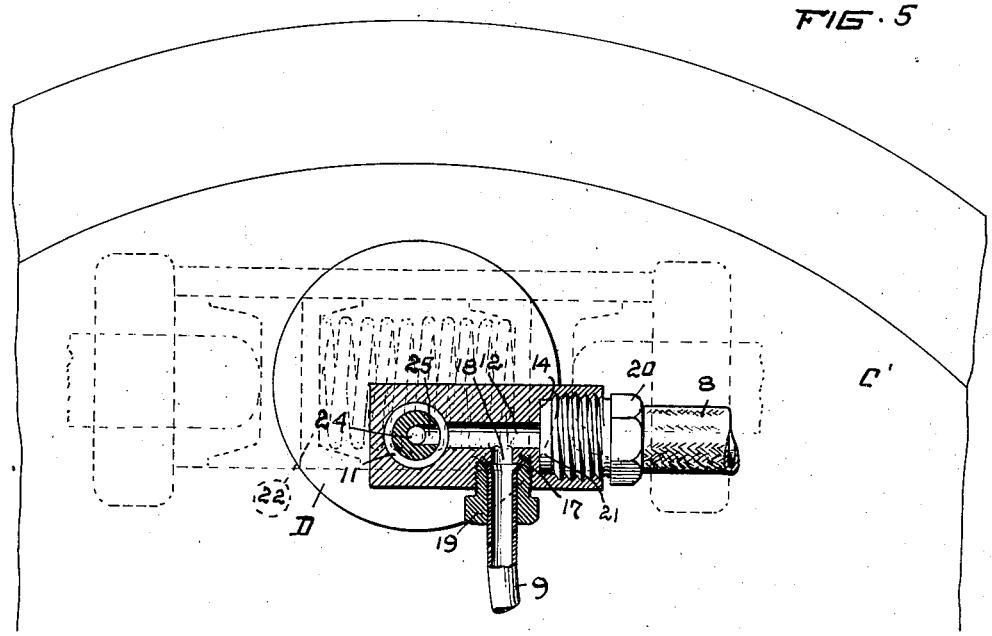
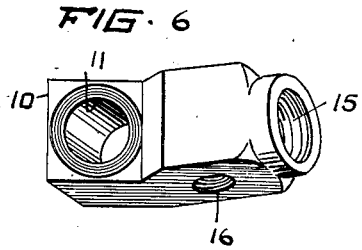
INVENTOR
A. J. WEATHERHEAD JR.
BY
Fisher, Moser + Moore,
ATTORNEY Patented May 23, 1933

1,909,989

UNITED STATES PATENT OFFICE

ALBERT J. WEATHERHEAD, JR., OF CLEVELAND, OHIO

HYDRAULIC BRAKE SYSTEM FOR AUTOMOBILES

Application filed May 26, 1930. Serial No. 455,478.

My invention relates to hydraulic brake systems for automobiles, and my object in general is to provide an improved construction and arrangement of fittings and connections for the hydraulic brakes of an automobile, and to provide in particular a new combination fitting which will reduce the number of fittings and joints heretofore used in such systems, thereby simplifying and expediting the assembly and inspection of such fittings and joints and safe-guarding to a greater extent against leakage, all as hereinafter more particularly pointed out and described, and also as exemplified in the accompanying drawings.

Thus, in the drawings, Fig. 1 is a plan view of a chassis frame of an automobile according to my invention. Fig. 2 is an enlarged end elevation and a sectional view of a rear axle assembly equipped with the invention, and Fig. 3 is a side elevation and sectional view of the same parts on line 3—3 of Fig. 2. Fig. 4 is an enlarged sectional view, in plan, of my improved fitting attached to the hydraulic braking device for one vehicle wheel, and Fig. 5 is a side elevation and sectional view of the same parts on line 5—5 of Fig. 4. Fig. 6 is a perspective view of the fitting itself.

Automobiles equipped with hydraulic brake systems usually include a master cylinder A supported upon some part of the automobile engine or the chassis frame. In certain systems a copper tube 2 extends from cylinder A to a fitting 3 affixed to one side member 4 of the chassis frame B near the steering wheels C. Three other copper tubes 5, 6, and 7, respectively, are coupled to fitting 3 to convey the fluid to the four hydraulic braking devices D—D' associated with the two steering wheels C and the rear driving wheels C', respectively, of the vehicle. According to common practice, short sections of flexible pipes or hose 8 are also used as extensions for the copper tubes 5, 6, and 7, respectively, owing to the relative movement which takes place between the spring-supported chassis frame and the wheels.

One purpose of this invention is to eliminate the T-fitting now commonly used on the axle housing in such systems, and reduce the number of coupling joints or places of possible leakage. Accordingly, I provide a fitting F of special form and construction adapted to be rigidly secured to one of the stationary brake housing members where a flexible hose 8 may be conveniently supported by the chassis frame and connected to the fitting and to the copper supply pipe 7 which extends lengthwise of one channeled side member of the chassis frame. A single connecting pipe or tube 9 is then employed between the two braking devices D' for the rear wheels C', instead of two separate pipes or tubes and a T-fitting as heretofore. The opposite ends of this single connecting pipe 9 are coupled detachably to separate fittings fixed to the separate brake housings D'—D', that is, to a fitting F' constructed as customarily, and to the special fitting F which is preferably constructed as follows:

Thus, referring to Figs. 4 to 6, fitting F is a solid body of elongated form which is substantially square in cross section and formed with an angularly-related or inclined clamping extension 10 having a circular opening 11 extending transversely therethrough from side to side thereof. A longitudinal bore 12 within the body of the fitting communicates at one end with one side of transverse opening 11 and at its opposite end with the smoothly-finished base portion 14 of an enlarged screw-threaded recess or cavity 15 in the outer end of the body. A smaller screw-threaded opening 16 is formed in one flat side of the fitting body at right angles to longitudinal bore 11, together with a conical seat 17 having a central bore or passage 18 which intersects or opens into bore 11. In practice, the small copper tube or pipe 9 is flared at its end and clamped in sealing union with conical seat 17 by a tubular nut 19, and the flexible hose 8 which supplies the fluid is also connected by a nut 20 which is introduced into the end recess 15 to clamp a flat sealing member 21 against the flat counterbored seat or smoothly-finished base portion 14 opposite the entrance to longitudinal bore 12. Accordingly, the fluid is delivered directly from supply hose 8 to the branch pipe 9 and to the transverse opening 11 in the fitting in equal degree, and thence to each of the braking devices D'—D' for the rear driving wheels of the vehicle. To permit the fluid to pass from opening 11 to the hydraulic cylinder 22 of the braking device D' to which fitting F is attached, the fitting or attachment bolt 23 which passes through opening 11, is reduced in diameter in part and provided with an axial opening 24 and a radial opening 25, see Fig. 4. Sealing is effected at opposite ends of opening 11 by suitable sealing washers 26 and 27, interposed between fitting F, cylinder 22 and the head 28 of the attachment bolt 23. Preferably, the washer seating surfaces on the fitting are also roughened or corrugated annularly of opening 11 to foster sealing results at the joints.

The attachment of fitting F to one brake housing simplifies and improves the hydraulic braking system as made heretofore, as it permits the main supply tube or pipe 7 for the rear wheel braking devices to extend in protected position throughout its entire length within one of the channeled side members of the chassis frame, with the end of the pipe located and arranged in close proximity to a rear wheel and braking device, so that a short section 8 of flexible hose may be connected to the pipe and coupled directly with the fitting F which is fixed to and carried by the braking device. Furthermore, by providing a combination fitting F for hose 8 and an extension pipe 9, as described, only a single tube or pipe 9 is required between the two braking devices for the rear wheels and this pipe or tube may be rigidly secured to the axle housing between its opposite ends, and only two union connections are required for this pipe,—one at fitting F for one braking device for one wheel, and the other at the fitting F' mounted on the second braking device at the opposite end of the axle for the second driving wheel. The T-fitting formerly required is dispensed with, the number of joints is reduced and leakage minimized to that additional extent, the assembly of the parts and inspecting work simplified, greater protection afforded with less liability of parts becoming detached, and the installation and repair costs reduced.

What I claim is:

1. A fitting adapted to be used in hydraulic brake systems for automobiles, comprising a solid body of elongated form having a clamping extension angularly related to said body, a circular opening extending transversely through said extension, a longitudinal bore within said body communicating with said opening, a screw threaded recess in the end of said body, communicating with said bore, a screw threaded opening in the side of said body angularly related to said bore and communicating therewith, and an attachment bolt for said fitting extending freely rotatably through said opening in said extension and adapted to draw said clamping extension tightly against a brake housing, said bolt being circumferentially reduced at one end and provided with an axial and a radial opening to effect communication of said bore with said bolt and to form a series of passages through said fitting when attached to a brake housing.

2. A fitting adapted to be used in hydraulic brake systems for automobiles, comprising a solid body having a clamping extension angularly related to said body, a circular opening extending through said extension, a tubular attachment bolt reduced at one end extending through said opening and adapted to draw said extension tightly against a brake housing, a main passage within said body communicating with the interior of said tubular bolt and a branch passage communicating with said main passage, said branch passage including a screw threaded entrance and a conical seat at the base of said entrance.

In testimony whereof I affix my signature.

ALBERT J. WEATHERHEAD, Jr.